July 21, 1964  L. K. M. MASTERS  3,141,607
BLOWERS

Filed April 10, 1963  2 Sheets-Sheet 1

INVENTOR
LEONARD KENNETH MORGAN MASTERS
BY Kirschstein, Kirschstein & Ottinger
ATTORNEYS July 21, 1964  L. K. M. MASTERS  3,141,607
BLOWERS
Filed April 10, 1963  2 Sheets-Sheet 2
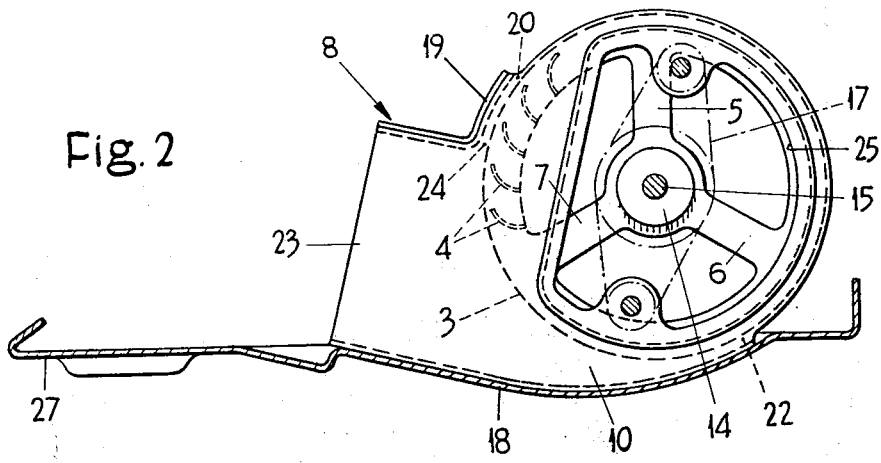
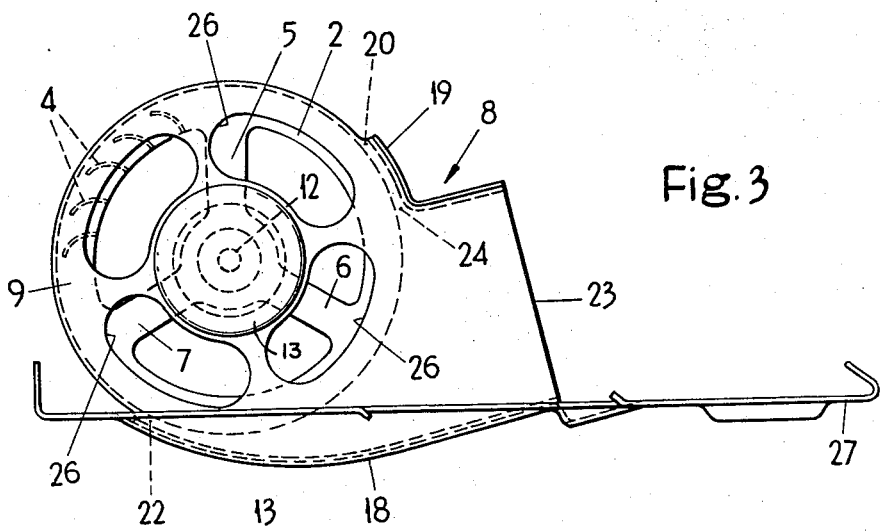
INVENTOR
LEONARD KENNETH MORGAN MASTERS
BY
ATTORNEYS 3,141,607
BLOWERS
Leonard Kenneth Morgan Masters, New Barnet, England, assignor to The General Electric Company Limited, London, England, and S. Smith & Sons (England) Limited, London, England
Filed Apr. 10, 1963, Ser. No. 272,039
Claims priority, application Great Britain Apr. 13, 1962
1 Claim. (Cl. 230—117)

The present invention relates to blowers and particularly to blowers of the kind having a bladed rotor in the form of a cylindrical cage mounted for rotation about its longitudinal axis an inlet zone and an outlet zone for air passing through the cage being spaced from each other around the cylindrical periphery of the rotor.

Theoretically the inlet and outlet zones each extend the whole length of the blades, but it has been found in practice, where the blower has ducting defining the inlet and outlet zones, that the air flow at the ends is substantially reduced compared with the airflow midway along the cage. The present invention is directed to reducing this unevenness in air flow.

According to the present invention a blower of the kind specified above is arranged so that air is induced to flow into the rotor through one or both rotor end planes. It has been found that a blower of the kind specified operating with air entering the rotor in this way at both ends has an increased air flow through the rotor blades in the regions of the outlet zone at the ends of the rotor compared with a blower whose rotor ends are closed.

In order that the present invention may be readily understood, one blower unit in accordance therewith will now be described by way of example with reference to the three figures of the accompanying drawing, in which:

FIGURE 2 is a sectional view on the line II—II of FIGURE 1, and

FIGURE 3 is an end elevation of the blower unit.

Figure 1:
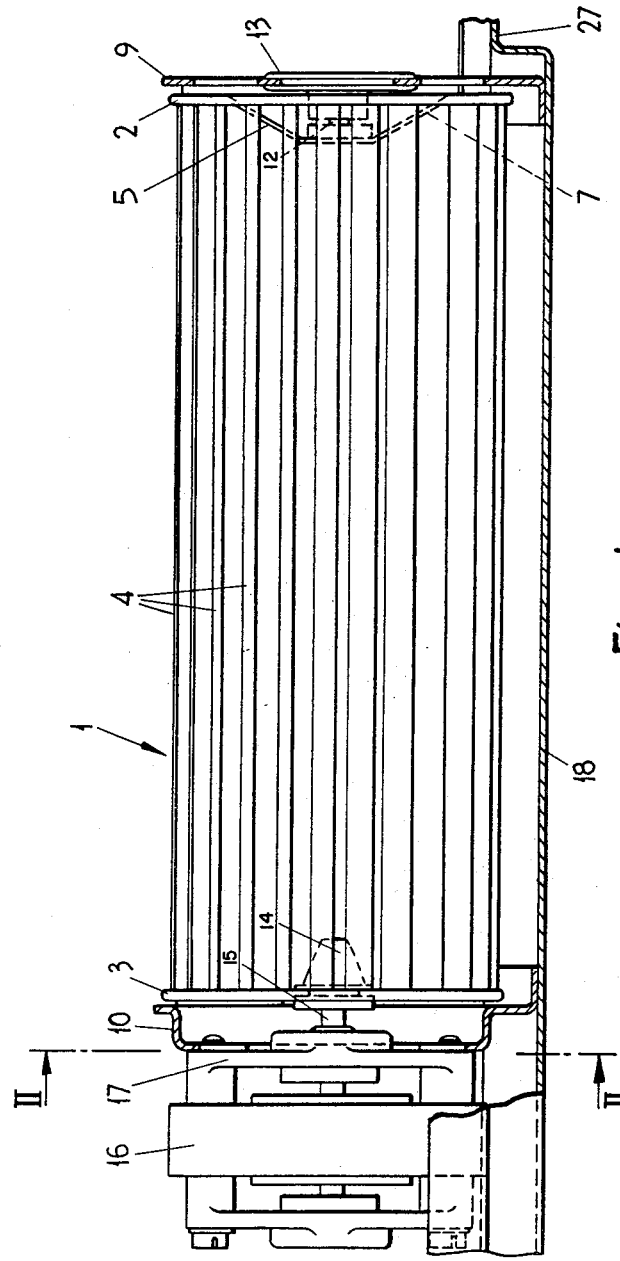
FIGURE 1 is a part sectional rear elevation of the blower unit.

Referring now to the drawing, the blower unit has a rotor 1 comprising a pair of circular end members 2 and 3 between which extend blades 4 uniformly spaced around the peripheries of the end members to form a cylindrical cage. In FIGURES 2 and 3 only a few blades have been shown so as not to confuse the drawing. The circular end members 2 and 3 of the rotor 1 are spoked wheels each having three spokes 5, 6 and 7 disposed at 120° to each other so that effectively they do not close the end of the rotor. The blades 4 are rectangular strips of curved cross section and are fitted to the end members 2 and 3 so that they are concave facing in the direction of rotation.

The rotor 1 is located in sheet metal ducting 8 forming a volute and thus having two parallel side portions 9 and 10 with the outline of a scroll (as is seen in FIGURES 2 and 3) that is to say of a circle with a tangential tail. The longitudinal axis of the rotor 1 extends substantially through the centre of the circles. The end member 2 at one end of the rotor has a stub spindle 12 supported in the side portion 9 by a rubber grommet 13 which fits in the side portion 9 and carries a bearing for the spindle 12. The other end member 3 of the rotor is connected through a grommet 14 to the shaft 15 of an electric driving motor 16 which is supported on the other side portion 10 of the ducting through bracket 17 which forms part of the motor frame.

In known manner a gap is left in the curved portions 18 and 19 of the ducting 8, the gap extending peripherally of the rotor 1 from point 20 to point 22 (FIGURE 2) to form an inlet zone which thus extends over an arc of more than 180° of the circular side portions 2 and 3. The inlet zone extends the full length of the rotor as will be appreciated from FIGURE 1. An outlet from the ducting is provided at 23. The actual outlet zone from the rotor extends from point 22 to point 24 (FIGURE 2). Thus the ducting 8 is arranged in known manner to produce an air flow through the rotor 1 such that air passes into the rotor cage at the inlet zone and out of the rotor cage at an outlet zone in the ducting and is delivered at the tail end 23 of the ducting.

Additionally the circular side portions 9 and 10 of the ducting 8 are apertured. In the side portion 10 where the rotor end member 3 connects with the driving motor 16 a single aperture 25 is provided revealing almost the whole of that end of the rotor. On the other side where the rotor 1 is supported in the side portion 9 of the ducting 8, a ring of apertures 26 is provided around the rotor supporting position. Thus as the rotor 1 rotates, air is also induced through these apertures 25 and 26 and into the rotor 1 through the rotor end planes, in this case defined by the rotor end members 2 and 3.

As will be appreciated various other ways of aperturing the end members and side portions may be used. For example the end members of the rotor may be discs suitably apertured.

The induced air flow through side portion 10 provides cooling for the electric driving motor.

Heating elements may be mounted on the extension 27 of the ducting 8 and a casing may be suitably built up around the blower unit, the parts 18 and 27 forming the bottom of the casing.

I claim:

A blower comprising a bladed rotor in the form of an elongated cylindrical cage mounted for rotation about its longitudinal axis and having open ends and blades which are concave facing in the direction of rotation of said rotor and which have their radially outer edge leading their radially inner edge in the direction of rotation of said rotor, ducting surrounding the periphery of said rotor and defining an air inlet zone and an air outlet zone which are spaced from each other around the cylindrical periphery of said rotor and which extend the full length of said rotor, the inlet zone extending over an arc of substantially 180° about the longitudinal axis of said rotor and that portion of the ducting extending away from the outlet zone in the direction of rotation of said rotor being concentric with the rotor and extending over an arc about the longitudinal axis of said rotor not exceeding 45°, said ducting also having two parallel side portions transverse to the longitudinal axis of said rotor, the side portions being apertured to permit air to flow to said open ends of said rotor, and an electric motor drivingly connected to said rotor and whose stationary part is fixed to the outside of said ducting at a position such that at least part of the air entering through said aperturing in said ducting passes over said electric motor.

References Cited in the file of this patent
UNITED STATES PATENTS

| 938,781 | McDonough | Nov. 2, 1909 |
| 997,127 | Hanrahan et al. | July 4, 1911 |
| 997,808 | Hanrahan | July 11, 1911 |
| 1,838,169 | Anderson | Dec. 29, 1931 |
| 2,251,553 | Redmond | Aug. 5, 1941 |
| 2,849,118 | Ashton | Aug. 26, 1958 |

FOREIGN PATENTS

| 362,576 | France | Apr. 9, 1906 |